(12) United States Patent
Srinivasan et al.

(10) Patent No.: US 9,189,582 B2
(45) Date of Patent: Nov. 17, 2015

(54) PROGRAMMABLE PATTERN AWARE VOLTAGE ANALYSIS

(71) Applicant: Mentor Graphics Corporation, Wilsonville, OR (US)

(72) Inventors: Sridhar Srinivasan, Tualatin, OR (US); Mark Hofmann, Portland, OR (US); Ziyang Lu, Camas, WA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/169,414

(22) Filed: Jan. 31, 2014

(65) Prior Publication Data

US 2015/0058818 A1     Feb. 26, 2015

Related U.S. Application Data

(60) Provisional application No. 61/869,163, filed on Aug. 23, 2013.

(51) Int. Cl.
*G06F 17/50* (2006.01)

(52) U.S. Cl.
CPC .......... *G06F 17/5045* (2013.01); *G06F 17/504* (2013.01); *G06F 17/5054* (2013.01); *G06F 2217/78* (2013.01)

(58) Field of Classification Search
CPC ............ G06F 17/5045; G06F 17/5054; G06F 17/504; G06F 2217/78
See application file for complete search history.

(56) References Cited

U.S. PATENT DOCUMENTS

| | | | |
|---|---|---|---|
| 6,820,240 B2 * | 11/2004 | Bednar et al. .................. | 716/113 |
| 7,152,216 B2 * | 12/2006 | Kapoor et al. ................ | 716/103 |
| 7,498,842 B2 * | 3/2009 | Williams ......................... | 326/81 |
| 7,516,428 B2 * | 4/2009 | Fulga et al. .................... | 716/132 |
| 7,525,373 B1 * | 4/2009 | Ogilvie et al. ................. | 327/564 |
| 7,669,165 B2 * | 2/2010 | Pandey et al. ................. | 716/109 |
| 7,673,276 B2 * | 3/2010 | Wang ............................ | 716/104 |
| 7,683,667 B2 * | 3/2010 | Kim ................................ | 326/63 |
| 7,694,251 B2 * | 4/2010 | Chandramouli et al. ..... | 716/106 |
| 7,712,061 B2 * | 5/2010 | Kapoor et al. ................ | 716/106 |
| 7,839,155 B2 * | 11/2010 | Butler ...................... | 324/754.07 |
| 7,945,875 B2 * | 5/2011 | Anand et al. .................. | 716/103 |
| 8,072,237 B1 * | 12/2011 | Rahim et al. ................... | 326/39 |
| 8,176,453 B2 * | 5/2012 | Yang et al. .................... | 716/106 |
| 8,339,177 B2 * | 12/2012 | Jarrar et al. ................... | 327/333 |
| 8,392,862 B1 * | 3/2013 | Siguenza et al. ............. | 716/120 |
| 8,570,077 B2 * | 10/2013 | Kwon et al. .................. | 327/143 |
| 8,595,660 B2 * | 11/2013 | Newcomb et al. ............ | 716/109 |
| 8,667,192 B2 * | 3/2014 | Allaire et al. ................. | 710/104 |
| 8,683,419 B1 * | 3/2014 | Hines et al. ................... | 716/133 |
| 8,839,164 B2 * | 9/2014 | Kavalipati et al. ............ | 716/106 |
| 2002/0158299 A1 * | 10/2002 | Castro Simas et al. ....... | 257/499 |
| 2010/0037188 A1 * | 2/2010 | Jamann et al. .................... | 716/2 |
| 2010/0095256 A1 * | 4/2010 | Kavalpati et al. ................ | 716/5 |

(Continued)

*Primary Examiner* — Naum B Levin
(74) *Attorney, Agent, or Firm* — Mentor Graphics Corporation

(57) ABSTRACT

This application discloses a voltage analysis tool to perform a static power aware analysis on a circuit design without having to simulate the circuit design. The voltage analysis tool can determine a set of components in the circuit design corresponds to a design pattern representing a voltage-transition device, and set an output voltage for the set of components based, at least in part, on characteristics of the voltage-transition device. The voltage analysis tool can propagate the output voltage to other portions of the circuit design, and determine whether the portions of the circuit design receiving the output voltage have a rule violation.

20 Claims, 10 Drawing Sheets

(56) References Cited

U.S. PATENT DOCUMENTS

| | | | |
|---|---|---|---|
| 2010/0161303 A1* | 6/2010 | McGowan et al. | 703/13 |
| 2010/0192115 A1* | 7/2010 | Yang et al. | 716/5 |
| 2012/0221833 A1* | 8/2012 | Allaire et al. | 712/37 |
| 2013/0027016 A1* | 1/2013 | Okunishi et al. | 323/311 |
| 2013/0318487 A1* | 11/2013 | Hackney et al. | 716/106 |
| 2014/0025325 A1* | 1/2014 | Kwon et al. | 702/64 |

* cited by examiner

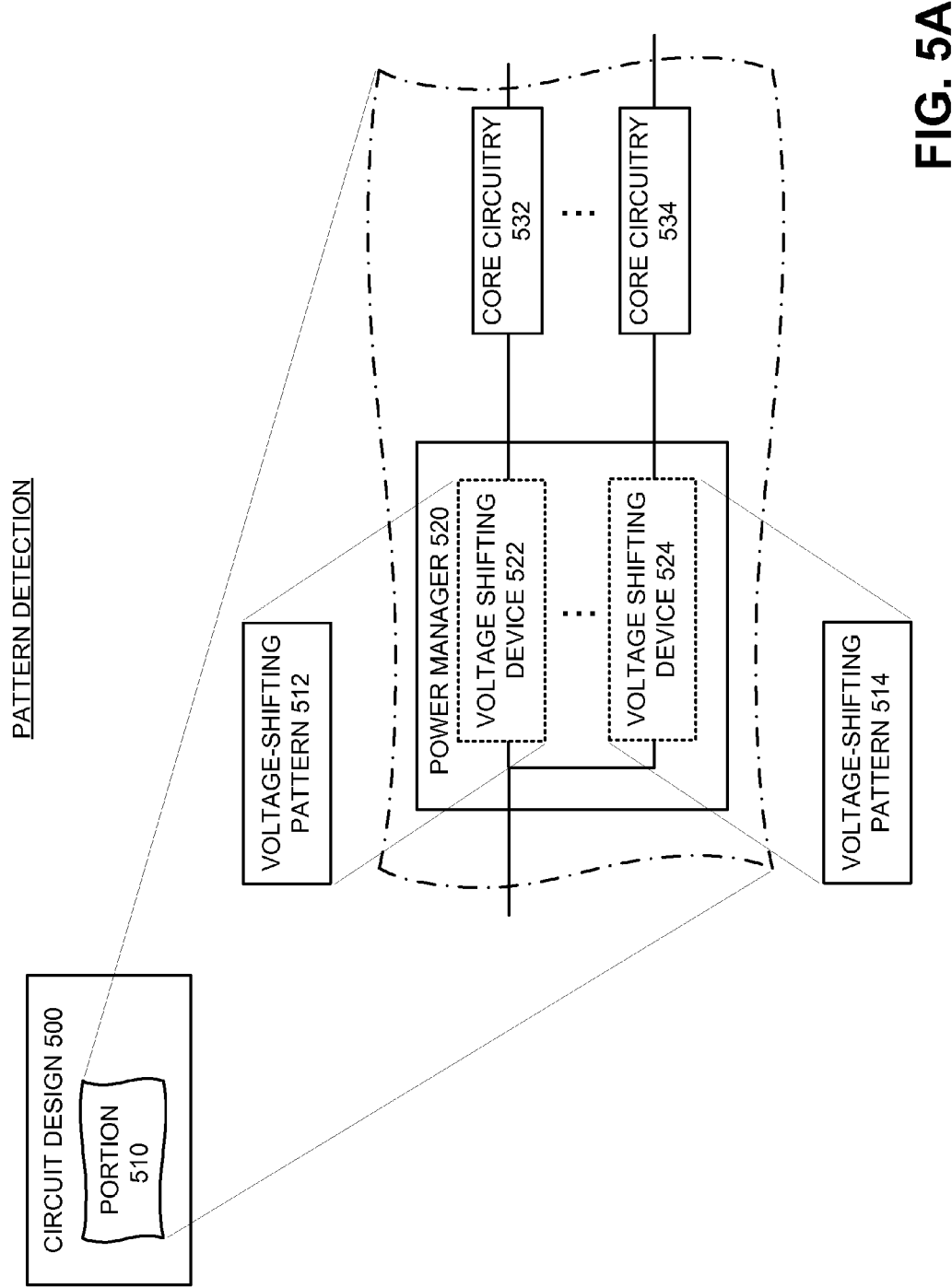

PROGRAMMABLE PATTERN AWARE VOLTAGE ANALYSIS

RELATED APPLICATIONS

This application claims benefit of and priority to U.S. Provisional Patent Application No. 61/869,163, filed Aug. 23, 2013, which is incorporated by reference herein.

TECHNICAL FIELD

This application is generally related to electronic design automation and, more specifically, to programmable pattern aware voltage analysis.

BACKGROUND

Microdevices, such as integrated microcircuits and microelectromechanical systems (MEMS), are used in a variety of products, from automobiles to microwaves to personal computers. Designing and fabricating microdevices typically involves many steps, known as a "design flow." The particular steps of a design flow often are dependent upon the type of microcircuit, its complexity, the design team, and the microdevice fabricator or foundry that will manufacture the microcircuit. Typically, software and hardware "tools" verify the design at various stages of the design flow by running software simulators and/or hardware emulators, and errors in the design are corrected or the design is otherwise improved.

Several steps are common to most design flows for integrated microcircuits. Initially, the specification for a new circuit is transformed into a logical design, sometimes referred to as a register transfer level (RTL) description of the circuit. With this logical design, the circuit can be described in terms of both the exchange of signals between hardware registers and the logical operations that can be performed on those signals. The logical design typically employs a Hardware Design Language (HDL), such as the Very high speed integrated circuit Hardware Design Language (VHDL). As part of the creation of a logical design, a designer will also implement a place-and-route process to determine the placement of the various portions of the circuit, along with an initial routing of interconnections between those portions. The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices, such as transistors, resistors, and capacitors, which will be used in the circuit, along with their interconnections. This device design generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the desired functions. This analysis is sometimes referred to as "formal verification."

After "formal verification," the design can be reviewed for reliability issues caused by the electrical system, sometimes referred to as reliability verification, and the design can be again transformed, this time into a physical design that describes specific geometric elements. Reliability verification can include reviewing the design for protection from electrostatic discharge (ESD) events, detecting electrical overstress (EOS) situations, performing voltage-aware design rule checking (DRC), or the like.

The physical design often is referred to as a "layout" design. The geometric elements, which typically are polygons, define the shapes that will be created in various materials to manufacture the circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Typically, a designer will perform a number of analyses on the resulting layout design data. For example, with integrated circuits, the layout design may be analyzed to confirm that it accurately represents the circuit devices and their relationships as described in the device design. The layout design also may be analyzed to confirm that it complies with various design requirements, such as minimum spacings between geometric elements. Still further, the layout design may be modified to include the use of redundant geometric elements or the addition of corrective features to various geometric elements, to counteract limitations in the manufacturing process, etc. For example, the design flow process may include one or more resolution enhancement technique (RET) processes, that modify the layout design data to improve the usable resolution of the reticle or mask created from the design in a photolithographic manufacturing process.

After the layout design has been finalized, it is converted into a format that can be employed by a mask or reticle writing tool to create a mask or reticle for use in a photolithographic manufacturing process. The written masks or reticles then can be used in a photolithographic process to expose selected areas of a wafer to light or other radiation in order to produce the desired integrated microdevice structures on the wafer.

Returning to reliability verification, tools that can detect electrical overstress situations and perform voltage-aware design rule checking, often do so in a two-stage process—performing voltage propagation through the design, for example, at the schematic-level, and then comparing particular circuits in the design and their corresponding propagated voltages to various electric rules or design rules. Since reliability verification is typically performed without design simulation, i.e., without an understanding of electrical performance of the devices in the design, the tools often propagate a common voltage throughout the design, perform rule checking based on that common voltage, and determine a presence of electrical violations, often numbering in the millions for large designs. The tool then can allow device designers to manually traverse the design and overwrite any previously propagated voltages based on their knowledge of the underlying circuit functionality, which can allow the tool to re-perform voltage propagation and subsequent rule checks. This iterative process can continue until the device designer has cleared or eliminated the electrical violations or discovered a design error to fix in the schematic or netlist.

SUMMARY

This application discloses tools and mechanisms capable of performing programmable pattern-aware voltage analysis on a circuit design without simulation. According to various embodiments, the tools and mechanisms can determine a set of components in a circuit design correspond to a design pattern representing a voltage-transition device, and set an output voltage for the set of components based, at least in part, on characteristics of the voltage-transition device. The tools and mechanisms can propagate the output voltage to portions of the circuit design, and determine whether the portions of the circuit design receiving the output voltage have a rule violation.

DESCRIPTION OF THE DRAWINGS

FIGS. 5A and 5B illustrate an example implementation of pattern-aware voltage analysis according to various embodiments of the invention.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

Figure 1:
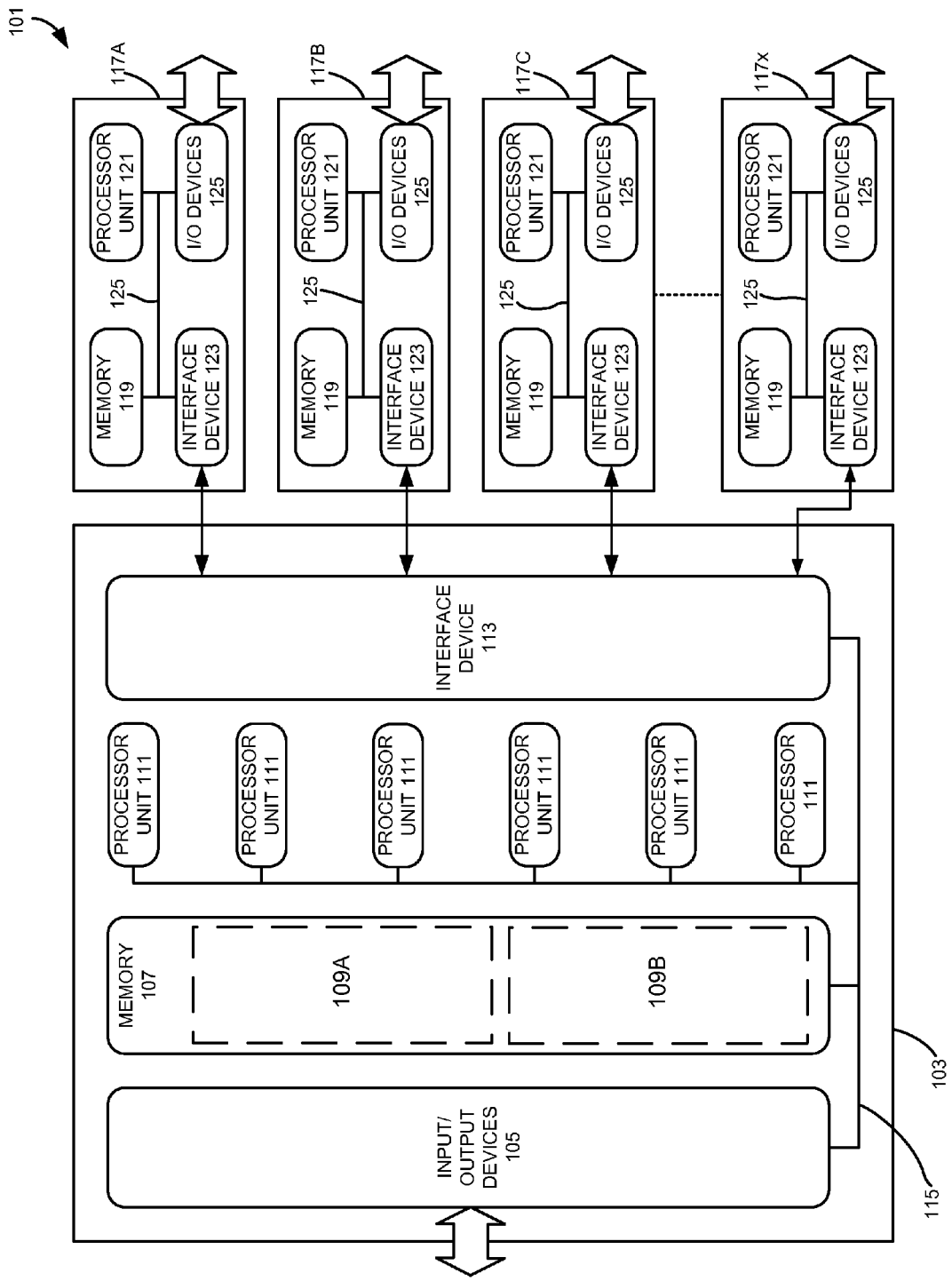
FIGS. 1 and 2 illustrate an example of a computer system of the type that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
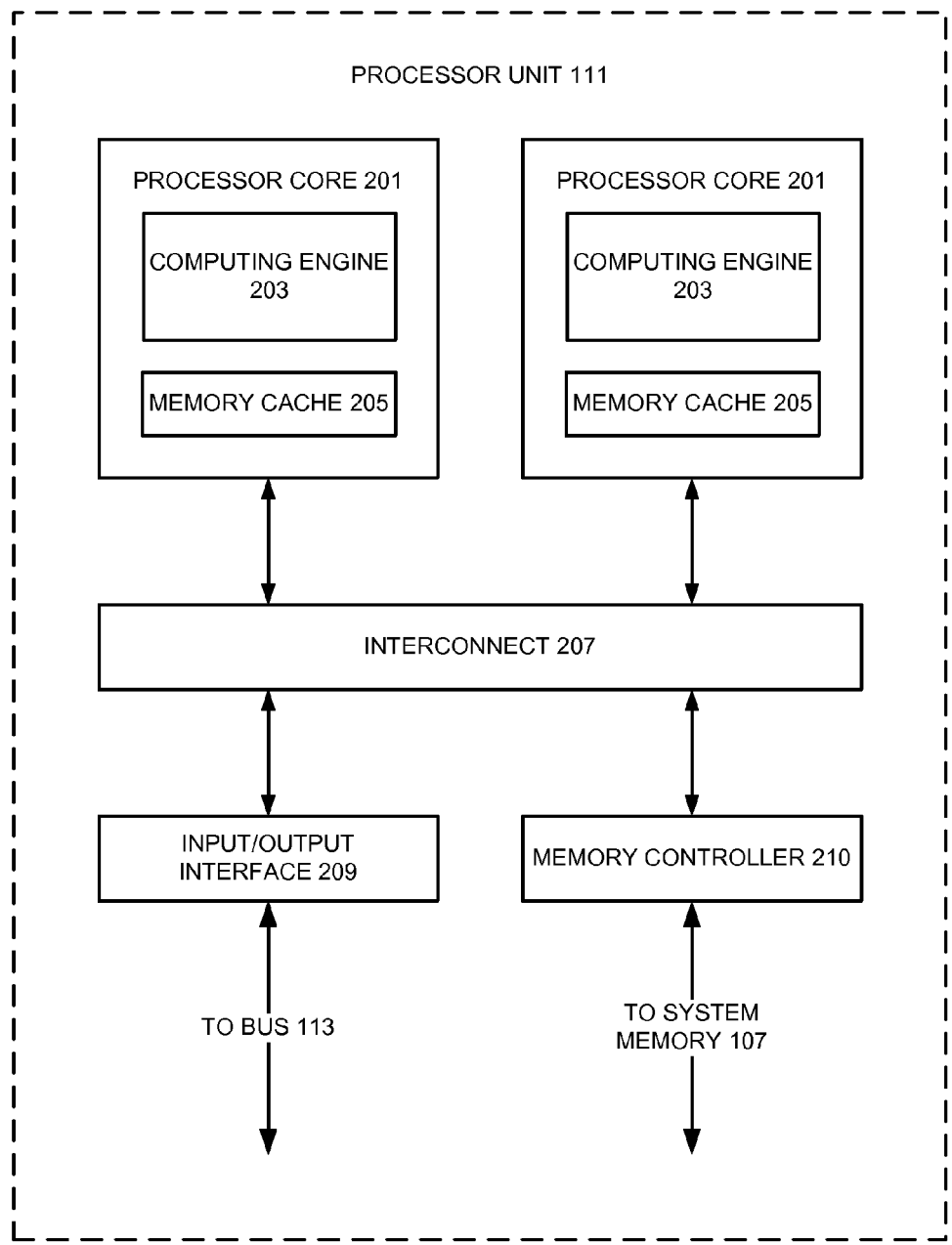

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ multi-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Pattern-Aware Voltage Analysis

Figure 3:
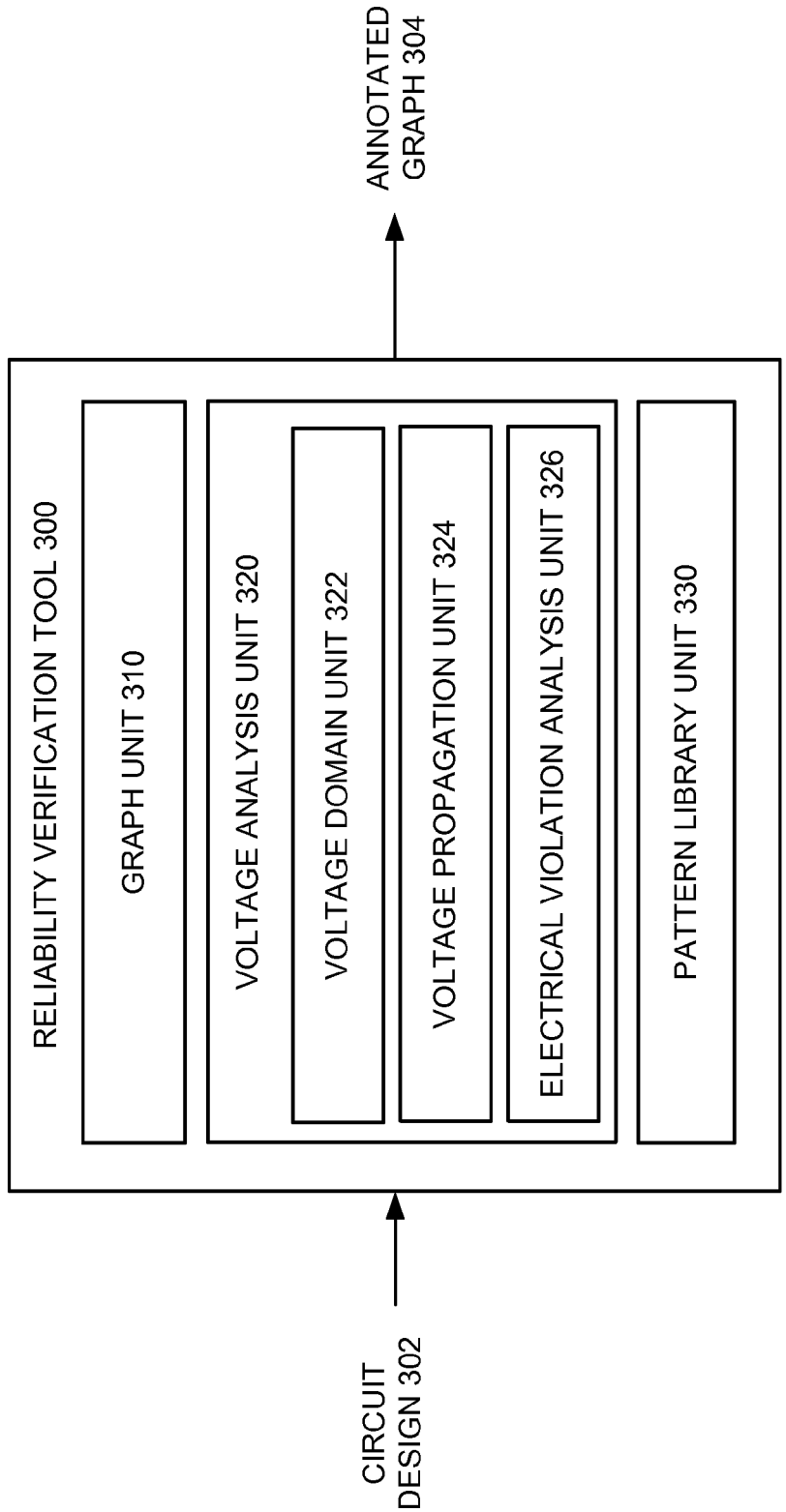
FIG. 3 illustrates an example of a reliability verification tool to perform pattern-aware voltage analysis that may be implemented according to various embodiments of the invention.

FIG. 3 illustrates an example of a reliability verification tool 300 to perform pattern-aware voltage analysis that may be implemented according to various embodiments of the invention. Referring to FIG. 3, the reliability verification tool 300 can receive a circuit design 302, which can describe components, such as capacitors, resistors, transistors, or the like, and the connectivity of those components in an electronic device. The circuit design 302 can model the electronic device at a schematic-level, for example, in a netlist coded with a Simulation Program with Integrated Circuit Emphasis (SPICE) language, an Electronic Design Interchange Format (EDIF) language, or the like. In some embodiments, the reliability verification tool 300 can receive the circuit design 302 from a source external to the reliability verification tool 300, such as a user interface of the computer network 101, another tool implemented by the computer network 101, or the reliability verification tool 300 may internally generate the circuit design 302.

The reliability verification tool 300 can include a graph unit 310 to generate a graphical representation of the circuit design 302. In some embodiments, the graph unit 310 can extract component information, such as component type and component interconnections, from the circuit design 302 and build the graphical representation of the circuit design 302 from the extracted component information.

The reliability verification tool 300 can include a voltage analysis unit 320 to propagate voltages in the circuit design 302 and then evaluate the circuit design 302 to determine whether the circuit design 302 violates any electrical or design rules based on the propagated voltages. Rather than propagating a common voltage throughout the circuit design 302, the voltage analysis unit 320 can locate the various voltage domains in the circuit design 302, determine how voltages transition (or are blocked from transitioning) between the various voltage domains, and propagate voltages in the circuit design 302 through the various voltage domains.

The voltage analysis unit 320 can include a voltage domain unit 322 to model a presence of various voltage domains and locations of transitions between those voltage domains, for example, without simulation of the circuit design 302. Since the voltage domain unit 322 can model various voltage domains without simulation of the circuit design 302, the reliability verification tool 300 can, in some embodiments, perform voltage analysis over a full-chip.

The voltage domain unit 322 can identify and model voltage domains in the circuit design 302 by locating voltage-shifting or voltage-transition devices within the circuit design 302 configured to transition voltage magnitudes between adjacent voltage domains. In some embodiments, these voltage-shifting devices can be voltage regulators, bias circuits, multiplexers or selection circuits, AOI (AND-OR-Invert) logic devices, a pass-gate tree circuit, or the like, or they can be sub-circuits within larger devices. The voltage domain unit 322 can detect the presence of the voltage-shifting devices by reviewing the circuit design 302 to identify patterns of components in the circuit design 302 that represent voltage-shifting devices. For example, voltage domain unit 322 can compare the circuit design 302 (or the graphical representation of the circuit design 302) to one or more design patterns that represent voltage-shifting devices. In some embodiments, the voltage domain unit 322 can access the design patterns from a pattern library unit 330 in the reliability verification tool 300. Since the circuit design 302 can utilize voltage-shifting devices to alter magnitudes of voltages propagated through the circuit design 302, the voltage-shifting devices can define transitions between different voltage domains or nets in the circuit design 302.

Figure 4:
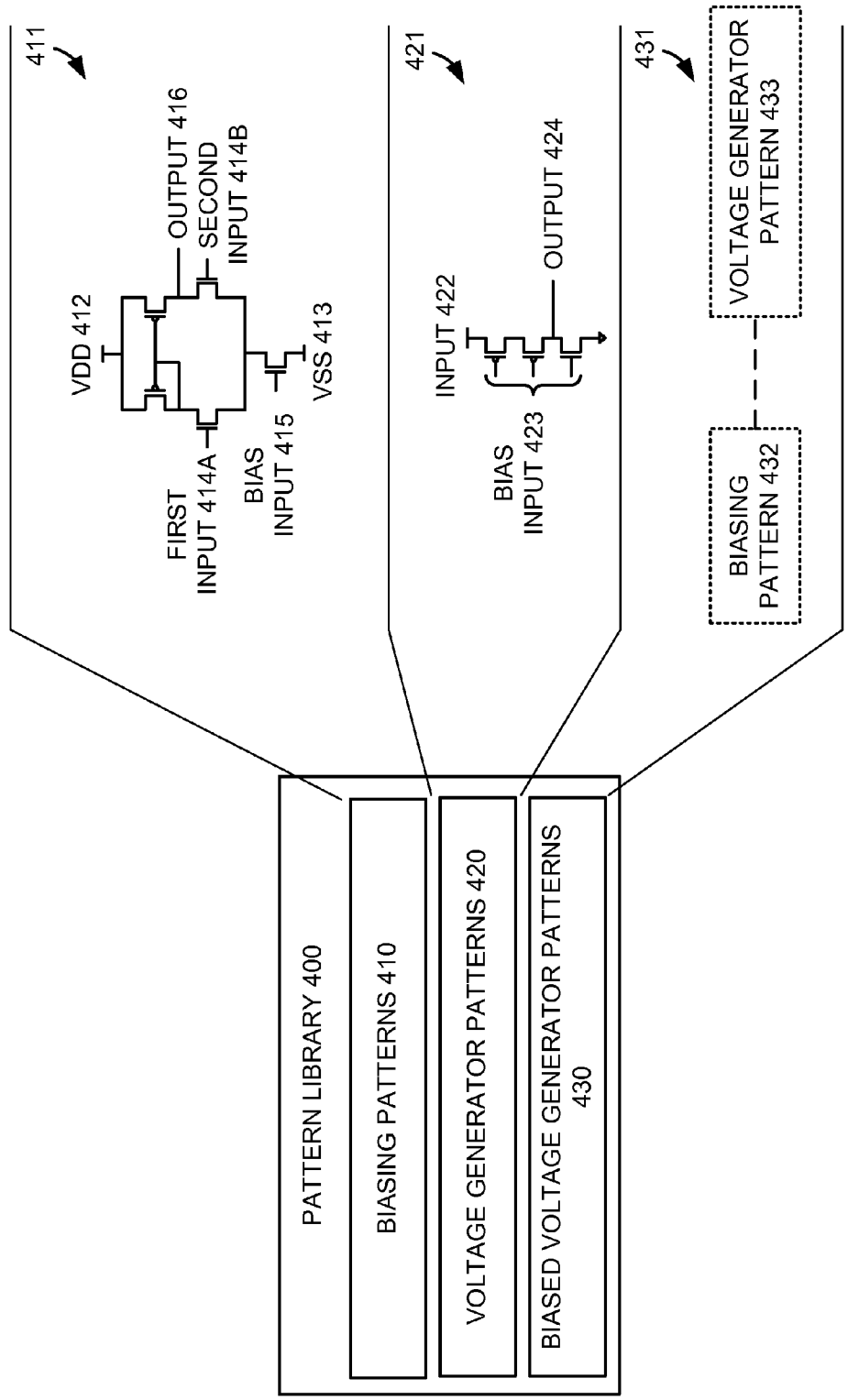
FIG. 4 illustrates an example description of a pattern library that may be implemented according to various embodiments of the invention.

FIG. 4 illustrates an example description of a pattern library 400 that may be implemented according to various embodiments of the invention. Referring to FIG. 4, the pattern library 400 can include multiple different types of patterns—biasing patterns 410, voltage generator patterns 420, biased voltage generator patterns 430, or the like—available for use by a reliability verification tool. Since some circuit designs can have multiple levels of hierarchy, the pattern library 400 can include patterns that model circuitry having the multiple levels of hierarchy in the circuit design.

The biasing patterns 410 can include one or more patterns of bias circuits, such as operational amplifiers or other circuitry capable of controlling a bias voltage. For example, the biasing patterns 410 can include a pattern of an operational amplifier 411, which can have a current mirror with two gated-tied p-type metal-oxide-semiconductor (PMOS) transistors coupled to receive a supply voltage VDD 412 at their source regions. One of the PMOS transistors has its gate-region coupled to its drain-region, while the other drain region corresponds to an output 416 for the operational amplifier. The operational amplifier 411 can include a pair of n-type metal-oxide-semiconductor (NMOS) transistors with their drain-regions coupled to the drain-regions of the corresponding PMOS transistors in the current mirror, respectively. The NMOS transistors can receive a first input 414A and a second input 414B, respectively. The operational amplifier 411 can include an NMOS bias transistor coupled to the source regions of the NMOS transistors, and receive a supply voltage VSS 413 at a source-region, a bias input 415 at a gate-region.

The voltage generator patterns 420 can include one or more patterns of a voltage generator circuit 421. The voltage generator circuit 421 can include transistors connected in series, all configured to receive various bias inputs 423 at their gate-regions. A first transistor can be PMOS transistor having a source-region coupled to receive a voltage at an input 422 and a drain-region coupled to a source-region of a second PMOS transistor. The second PMOS transistor has a drain-region coupled to a drain-region of an NMOS transistor and the output 424 of the voltage generator circuit 421. The NMOS transistor can have its source-region coupled to reference voltage, such as a ground or supply voltage VSS.

The biased voltage generator patterns 430 can include one or more hierarchical patterns, which can combine multiple previously-identified patterns in the circuit design to form a pattern of a voltage-shifting device. For example, the hierarchical pattern 431 can include a biasing pattern 432 coupled with a voltage generator pattern 433. In some embodiments, the hierarchical pattern 431 can allow the biasing pattern 432 to indirectly couple with the voltage generator pattern 433, for example, with intervening circuit components coupled between the biasing pattern 432 and the voltage generator pattern 433. Although FIG. 4 shows hierarchical patterns including a combination of a biasing pattern 432 and a voltage generator pattern 433, in some embodiments, the pattern library 400 can include different types of hierarchical patterns, for example, which can include biasing pattern 432 or the voltage generator pattern 433 with different companion circuitry patterns. The hierarchical patterns further can include any number of patterns, which may or may not include a biasing pattern 432 or a voltage generator pattern 433.

The pattern library 400 can include static patterns describing a preset circuit configuration, and/or include configurable patterns having definable parameters corresponding to an array of circuit configurations that can cover multiple different static patterns. For example, as described above, a static pattern of the voltage generator circuit 421 can define circuitry configured with two series-coupled PMOS transistors, one of which is drain-tied with an NMOS transistor. A configurable pattern of a voltage generator can be similar to the static pattern except that it can include one or more parameters to provide configuration variability. For example, the parameters in a configurable pattern can identify a range of circuit configurations, such as any number of multiple PMOS transistors coupled in series, which all can correspond to a voltage generator circuit. This flexibility in defining patterns as configurable can save time and effort as compared to generating separate static patterns for every possible circuit configuration.

The pattern library 400 also can include voltage synchronization patterns to identify circuit configurations that can propagate synchronized voltages to different portions of the circuit design. These voltage synchronization patterns, which can be static or configurable, may be similar to voltage-shifting patterns in that they can identify a magnitude of an output voltage, while also identifying that two different voltages in the circuit design are synchronized.

Referring back to FIG. 3, the voltage analysis unit 320 can include a voltage propagation unit 324 to propagate voltages through the circuit design 302 (or the graphical representation of the circuit design 302). The voltage propagation unit 324 (or the graph unit 310) can annotate the graphical representation of the circuit design 302 with properties, such as values of the propagated voltages. For example, the voltage analysis unit 320 can incorporate voltage magnitude values into the graphical representation of the circuit design 302 at the various interface nodes of the components in the circuit design 302. In some embodiments, the voltage analysis unit 320 can output the annotated graphical representation of the circuit design 302 as an annotated graph 304, for example, which can be presented on a display device.

Since the voltage domain unit 322 identified different voltage domains in the circuit design 302 and locations of transitions between those voltage domains, the voltage propagation unit 324, during voltage propagation, can set voltage magnitudes present in each domain differently. In some embodiments, the voltage propagation unit 324 can set the voltage magnitudes based on the type of voltage-shifting devices present at the transitions between different voltage domains. For example, some types of voltage-shifting devices can raise or lower a magnitude of a voltage transitioning between voltage domains to a preset magnitude or by a preset magnitude. Some types of voltage-shifting devices can block a voltage from transitioning between voltage domains. Other types of voltage-shifting devices may variously raise or lower a magnitude of a voltage transitioning between voltage domains, for example, based on a magnitude of the voltage for the voltage-shifting device to transition to a different voltage domain. In some embodiments, the patterns in the pattern library 330 can be encoded with a magnitude of the voltage shift that corresponds to the particular pattern type. The voltage propagation unit 324 can access programmable rules regarding alteration of voltage magnitudes for various voltage-shifting devices in the circuit design 302, for example, from the pattern library unit 330. These programmable rules, in some examples, can indicate a set magnitude voltage adjustment, such as a fixed voltage drop across certain voltage-shifting devices, a proportional voltage adjustment based on an input voltage to the voltage-shifting devices, a fixed voltage output for the voltage-shifting devices, or the like.

The voltage propagation unit 324 also can set the magnitudes of the voltages based on external input. For example, if the circuit design 302 is simulated by an external simulator (not shown), the reliability verification tool 300 can receive voltages corresponding to the simulation of the circuit design 302 and the voltage propagation unit 324 can populate the circuit design 302 (or the graphical representation of the circuit design 302) with the received voltages. In some embodiments, the reliability verification tool 300 can receive voltages corresponding to user input and the voltage propagation unit 324 can populate the circuit design 302 (or the graphical representation of the circuit design 302) with the received voltages.

The voltage analysis unit 320 can include an electrical violation analysis unit 326 to determine whether the circuit design 302 includes any electrical violations based on the propagated voltages. In some embodiments, the electrical violation analysis unit 326 can compare the propagated voltages and the corresponding components against various electrical or design rules. For example, the electrical violation analysis unit 326 can determine whether a component, such as a thin-film transistor, receives a voltage in excess of its rating capacity, whether certain components are located within always-on voltage nets, determine whether the circuit design 302 provides adequate spacing between components on different voltage nets, or the like. In some embodiments, the electrical violation analysis unit 326 can determine whether the circuit design 302 provides adequate spacing between components on different voltage nets by performing a latch-up check, a di-electric breakdown test, or the like.

The electrical violation analysis unit 326 also can utilize an indication of whether different voltages are synchronized when determining whether the circuit design 302 includes any electrical violations based on the propagated voltages. For example, one type of electrical violation check can compare a minimum voltage of one net versus a maximum voltage of another net, and vice versa, to identify what a spacing should be between the two nets. When the two nets have a synchronous voltage, however, the analysis by the electrical violation analysis unit 326 can correspond to a comparison of minimum voltages for the two different nets and a comparison of maximum voltages for the two different nets, which should reduce inaccurate identifications of electrical violations.

The electrical violation analysis unit 326 (or the graph unit 310) can annotate the graphical representation of the circuit design 302 with indications of electrical violations, for example, which can identify a location of the electrical violation, the corresponding rule prompting the electrical violation, or the like. In some embodiments, the voltage analysis unit 320 can prompt presentation of the annotated graphical representation of the circuit design 302 as an annotated graph 304, for example, on a display device.

Figure 5B:
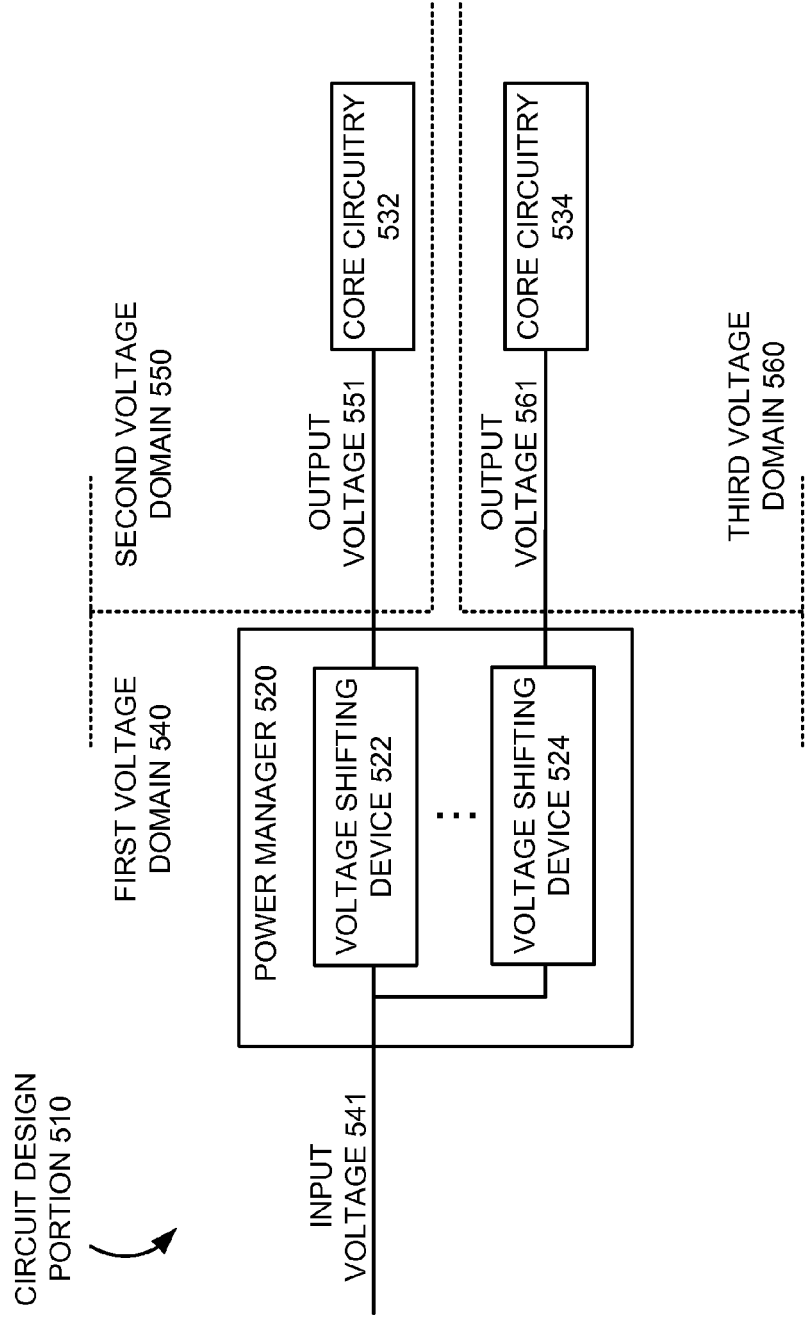

FIGS. 5A and 5B illustrate an example implementation of pattern-aware voltage analysis according to various embodiments of the invention. Referring to FIGS. 5A and 5B, a reliability verification tool, such as tool 300 described above in FIG. 3, can analyze a circuit design 500, for example, without simulation, to identify various voltage domains present in the circuit design 500, propagate voltages through the circuit design 500 based on the various voltage domains, and determine electrical violations, for example, by comparing electrical or design rules to the propagated voltages and the corresponding components in the circuit design 500 receiving the propagated voltages.

The reliability verification tool can detect the voltage domains present in the circuit design 500 by comparing component configurations, such as component type and interconnections, in the circuit design 500 to one or more design patterns, for example, stored in a pattern library. The design patterns can identify groups of one or more components that, when present in the circuit design 500, can adjust voltage magnitudes propagated in the circuit design 500, which can define transitions between voltage domains or nets in the circuit design 500.

As an illustrative example, FIGS. 5A and 5B show a portion 510 of the circuit design 500 analyzed by the reliability verification tool. The reliability verification tool can compare the components and/or interconnections in the portion 510 of the circuit design 500 to multiple voltage-shifting design patterns 512 and 514. When groups of one or more components in the portion 510 of the circuit design 500 match at least one of the voltage-shifting design patterns 512 and 514, the reliability verification tool can determine a presence and location of voltage-shifting devices 522 and 524 in the circuit design 500, for example, in a power manager 520 of the circuit design 500.

Based on the presence of the voltage-shifting devices 522 and 524 in the circuit design 500, the reliability verification tool can identify different voltage domains in the portion 510 of the circuit design 500 and propagate voltages through the circuit design 500 accordingly. In this illustrative example, the reliability verification tool can identify three voltage domains—a first voltage domain 540 including the voltage-shifting devices 522 and 524 receiving an input voltage 541, a second voltage domain 550 including core circuitry 532 receiving an output voltage 551 from the voltage-shifting device 522, and a third voltage domain 560 including core circuitry 534 receiving an output voltage 561 from the voltage-shifting device 524. The reliability verification tool can determine the magnitudes of the output voltages 551 and 561 based on the information corresponding to the voltage-shifting design patterns 512 and 514, and/or the magnitude of the input voltage 541. For example, the information corresponding to the voltage-shifting design patterns 512 and 514 can identify fixed voltage magnitudes for the output voltages 551 and 561, can identify a formula that can allow the reliability verification tool to derive the voltage magnitudes for the output voltages 551 and 561, or the like. In some embodiments, the fixed voltage magnitude can be higher or lower than the input voltage 541, set to zero, or floating. In some embodiments, the formula may indicate a proportion of the input voltage 541 for the reliability verification tool to utilize as a voltage magnitude for at least one of the output voltages 551 and 561. The formula also may indicate a set magnitude drop or rise of the input voltage 541 to utilize as a voltage magnitude for at least one of the output voltages 551 and 561.

Figure 6A:
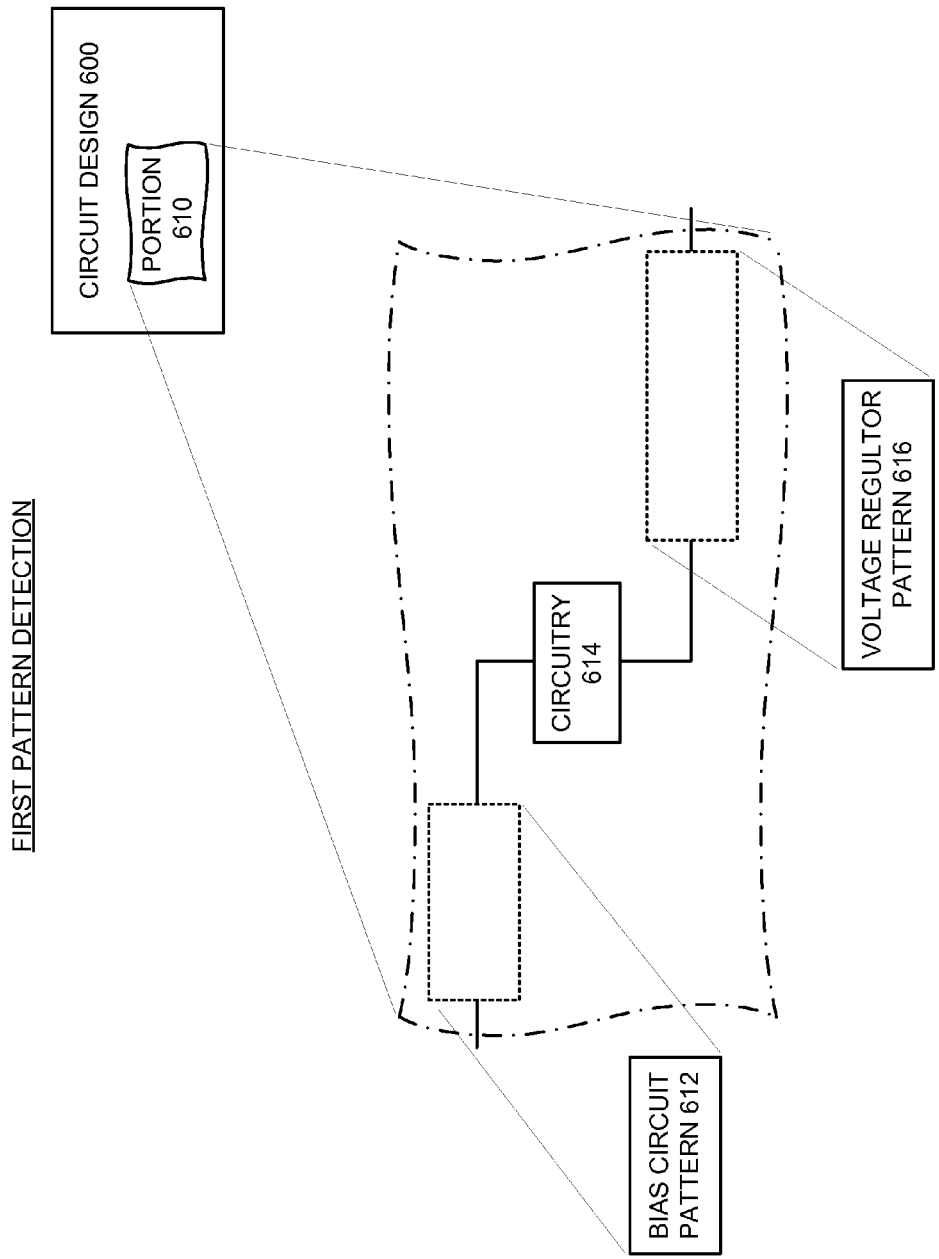
FIGS. 6A-6C illustrate another example implementation of pattern-aware voltage analysis according to various embodiments of the invention.
Figure 6B:
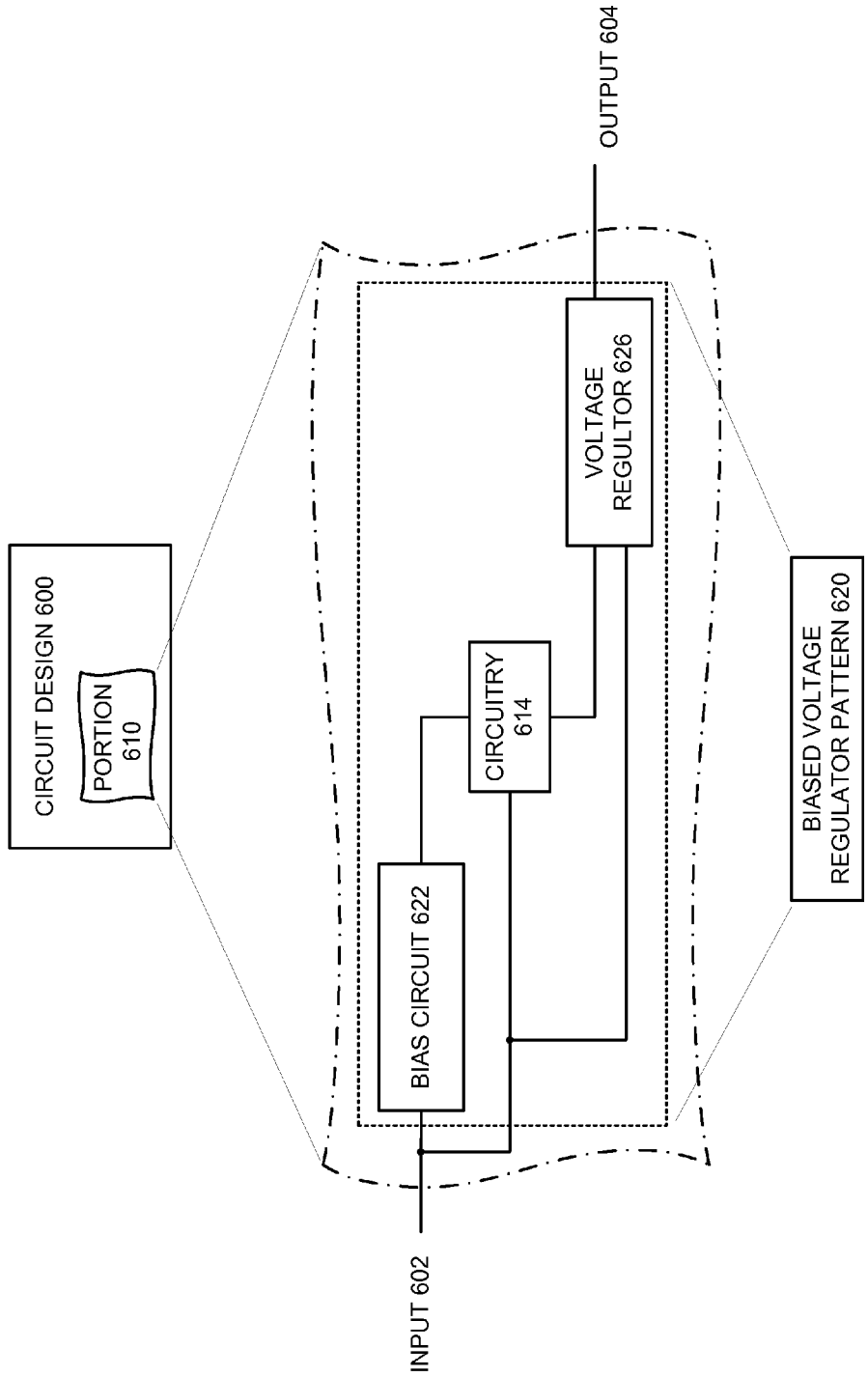
Figure 6C:
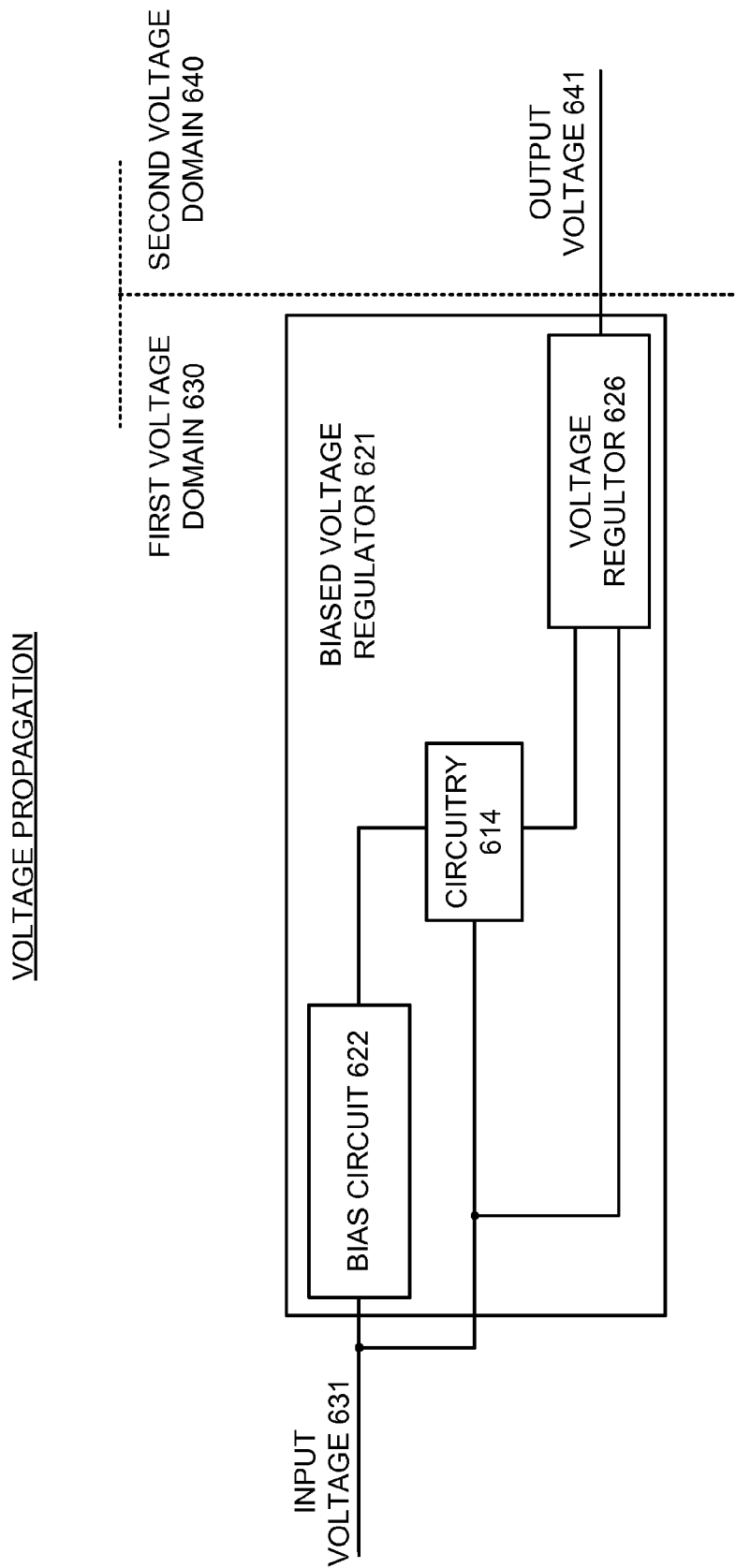

FIGS. 6A-6C illustrate another example implementation of pattern-aware voltage analysis according to various embodiments of the invention. Referring to FIGS. 6A-6C, a reliability verification tool, such as tool 300 described above in FIG. 3, can analyze a circuit design 600, for example, without simulation, to identify various voltage domains present in the circuit design 600, propagate voltages through the circuit design 600 based on the various voltage domains, and determine electrical violations, for example, by comparing electrical or design rules to the propagated voltages and the corresponding components in the circuit design 600 receiving the propagated voltages.

The reliability verification tool can detect the voltage domains present in the circuit design 600 through a multi-stage process, for example, by identifying certain types of circuits in the circuit design 600 and then determining whether a configuration of a plurality of the previously-identified circuits can be grouped to form a voltage-shifting device. As an illustrative example, FIGS. 6A-6C show a portion 610 of the circuit design 600 analyzed by the reliability verification tool. The reliability verification tool can compare the components and/or interconnections in the portion 610 of the circuit design 600 to multiple design patterns, such as a bias circuit pattern 612 and a voltage regulator pattern 616. When groups of one or more components in the portion 610 of the circuit design 600 match at least one of the bias circuit pattern 612 and the voltage regulator pattern 616, the reliability verification tool can utilize hierarchical patterns, such as a biased voltage regulator pattern 620, to determine a presence and location of a biased voltage regulator 621 in the circuit design 600.

The reliability verification tool can utilize the hierarchical patterns to review the portion 610 of the circuit design 600 and the previously-identified circuits, such as the bias circuit 622 and the voltage regulator 626, to determine whether the circuit design 600 couples the previously-identified circuits to form a voltage-shifting device, such as the biased voltage regulator 621. In some embodiments, the hierarchical patterns can allow for indirect coupling of the previously-identified circuitry, for example, to identify a voltage-shifting device having intermediate circuitry 614 disposed between bias circuit 622 and voltage regulator 626.

Based on the presence of the biased voltage regulator 621 in the circuit design 600, the reliability verification tool can identify different voltage domains in the portion 610 of the circuit design 600 and propagate voltages through the circuit design 600 accordingly. In this illustrative example, the reliability verification tool can identify two voltage domains—a first voltage domain 630 including the biased voltage regulator 621 to receive an input voltage 631, and a second voltage domain 640 to receive an output voltage 641 from the biased voltage regulator 621. The reliability verification tool can determine the magnitude of the output voltage 641 based on the information corresponding to the design patterns 612, 616, and 620, the magnitude of the input voltage 631, or the like. For example, the information corresponding to the design patterns 612, 616, and 620 can identify fixed voltage magnitude for the output voltage 641, can identify a formula that can allow the reliability verification tool to derive the voltage magnitudes for the output voltage 642, or the like. In some embodiments, the fixed voltage magnitude can be higher or lower than the input voltage 631, set to zero, or floating. In some embodiments, the formula may indicate a proportion of the input voltage 631 for the reliability verification tool to utilize as a voltage magnitude for at least one of the output voltage 641. The formula also may indicate a set magnitude drop or rise of the input voltage 631 to utilize as a voltage magnitude for at least one of the output voltage 641.

Figure 7:
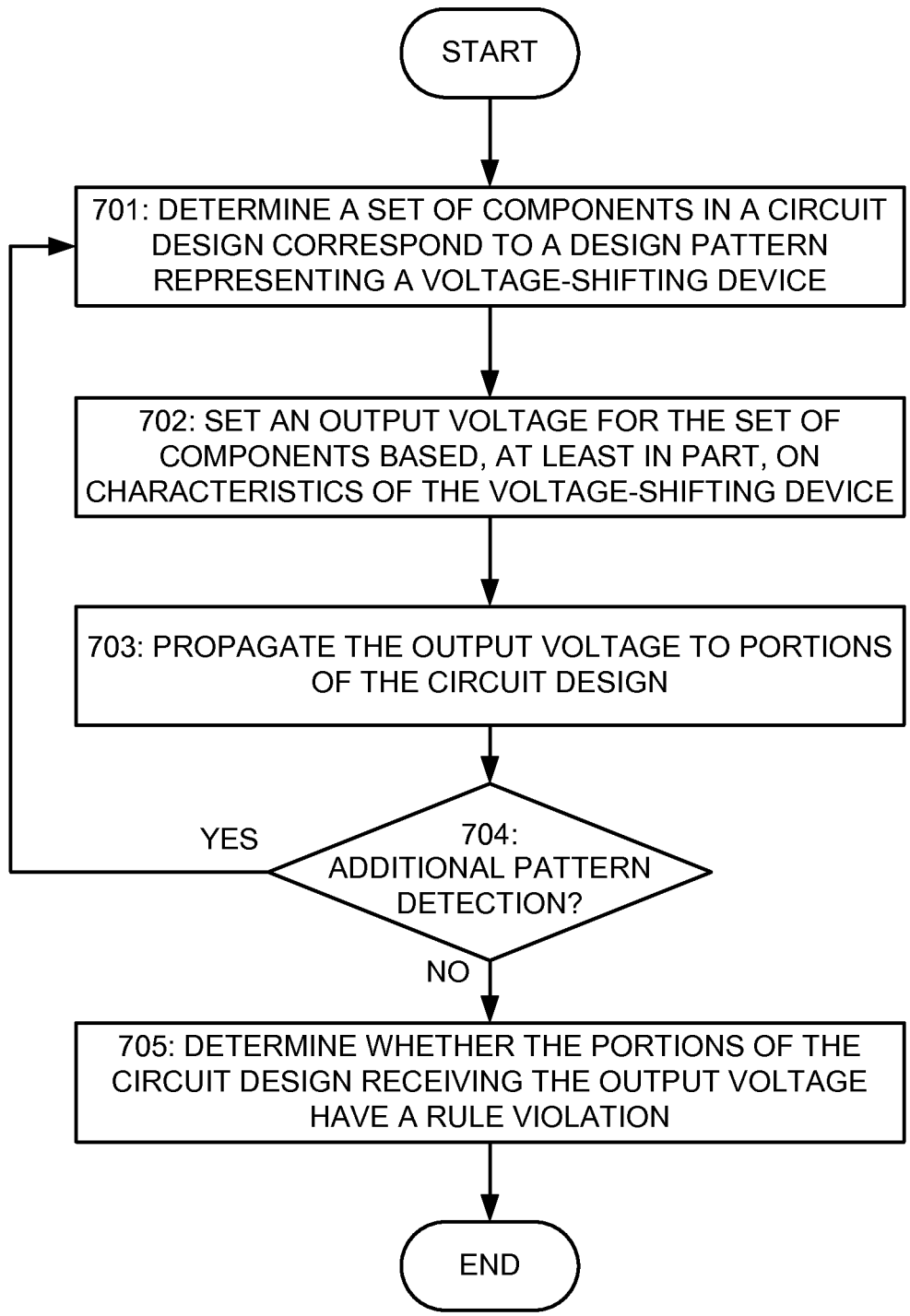
FIG. 7 illustrates a flowchart showing an example implementation of pattern-aware voltage analysis according to various examples of the invention.

FIG. 7 illustrates a flowchart showing an example implementation of pattern-aware voltage analysis according to various examples of the invention. Referring to FIG. 7, in a block 701, a reliability verification tool can determine a set of components in a circuit design correspond to a design pattern representing a voltage-shifting device. The reliability verification tool can compare the design pattern to the circuit design to determine whether any group of components in the circuit design match the design pattern. In some embodiments, the reliability verification tool can deem the group of components matching the design pattern to be a voltage-shifting device, which annunciates a transition between voltage domains in the circuit design.

In some embodiments, the reliability verification tool can perform a multi-stage process to determine whether the circuit design includes a voltage-shifting device. For example, the reliability verification tool can first compare the circuit design to design patterns for portions of a voltage-shifting device, and then, when portions of the voltage-shifting device are found, the reliability verification tool can compare those portions to a hierarchical design pattern for the voltage-shifting device to determine whether the circuit design combines the portions to form a voltage-shifting device.

In a block 702, the reliability verification tool can set an output voltage for the set of components based, at least in part, on characteristics of the voltage-shifting device, and in a block 703, the reliability verification tool can propagate the output voltage to portions of the circuit design. For example, the output voltage for the set of components can be set to a fixed magnitude, a magnitude that depends on the input voltage to the voltage-shifting device, such as a fixed voltage adjustment of the input voltage or a proportional adjustment of the input voltage depending on the characteristics of the voltage-shifting device, or the like. In some embodiments, the pattern for the set of components may be encoded with a magnitude of the output voltage for the set of components, or information allowing the reliability verification tool to derive the magnitude of the output voltage for the set of components, for example, based on the input voltage. The reliability verification tool can annotate a graphical representation of the circuit design with the propagated voltage or otherwise record the voltages propagated in the voltage domains of the circuit design.

In a block 704, the reliability verification tool can determine whether to perform additional pattern detection in the circuit design. The additional pattern detection can include reviewing the circuit design with design patterns corresponding to different types of circuits, or include checking the circuit design for hierarchical patterns after locating base components of a voltage-shifting device in the circuit design during a prior pattern detection operation. In some embodiments, the reliability verification tool can determine whether to perform additional pattern detection based on an availability of un-checked design patterns in a pattern library, based on a lack of change (or stabilization) of propagated voltages in the graphical representation of the circuit design, or the like. Although FIG. 7 shows the reliability verification tool can determine whether to perform additional pattern detection in the circuit design after setting the output voltage and performing voltage propagation, in some embodiments, the reliability verification tool can determine whether to perform additional pattern detection in the circuit design prior to setting the output voltage and performing voltage propagation.

In a block 705, the reliability verification tool can determine whether the portions of the circuit design receiving the output voltage have a rule violation. The reliability verification tool can review components of the circuit design along with their corresponding propagated voltages to determine whether there are any electrical and/or design rule violations in the circuit design. These electrical and/or design rule violations can include components receiving voltages outside of their operational ranges, components within different voltage domains or nets being spaced too closely together, or the like.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
matching, by a computing system, a set of components in a circuit design to a design pattern representing a voltage-transition device;
determining, by the computing system, a magnitude of an output voltage for the set of components in the circuit design based, at least in part, on a configuration of the voltage-transition device represented by the design pattern that matched the set of components; and
modifying, by the computing system, the circuit design to include the magnitude of the output voltage for the set of components.

2. The method of claim 1, further comprising:
propagating, by the computing system, the magnitude of the output voltage to outputs of other components of the circuit design; and
annotating, by the computing system, the outputs of the other components of the circuit design with the magnitude of the output voltage.

3. The method of claim 2, further comprising determining, by the computing system, whether the at least one of the other components of the circuit design include a rule violation based on the propagation of the magnitude of the output voltage.

4. The method of claim 1, further comprising identifying, by the computing system, an input voltage for the set of components, wherein determining the magnitude of the output voltage for the set of components based, at least in part, on the input voltage for the set of components and the design pattern representing the voltage-transition device.

5. The method of claim 1, wherein matching the set of components in the circuit design to the design pattern representing the voltage-transition device further comprising comparing, by the computing system, the design pattern against components in the circuit design to identify the voltage-transition device in the circuit design.

6. The method of claim 1, wherein matching the set of components in the circuit design to the design pattern representing the voltage-transition device further comprising:
comparing, by the computing system, a hierarchical design pattern including a first pattern and a second pattern to the circuit design to determine the circuit design includes a first device corresponding to the first pattern and a second device corresponding to the second pattern; and
correlating, by the computing device, the first device and the second device to the design pattern to identify the voltage-transition device in the circuit design.

7. The method of claim 1, wherein the circuit design is a netlist of components and their corresponding interconnections, and wherein matching the set of components in the circuit design to the design pattern representing the voltage-transition device further comprises comparing, by the computing system, one or more portions of the netlist to the design pattern to identify the voltage-transition device in the circuit design.

8. An apparatus comprising at least one computer-readable memory device storing instructions configured to cause one or more processing devices to perform operations comprising:
matching a set of components in a circuit design to a design pattern representing a voltage-transition device;
determining a magnitude of an output voltage for the set of components in the circuit design based, at least in part, on a configuration of the voltage-transition device represented by the design pattern that matched the set of components; and
modifying the circuit design to include the magnitude of the output voltage for the set of components.

9. The apparatus of claim 8, wherein the instructions are configured to cause one or more processing devices to perform operations further comprising:
propagating the magnitude of the output voltage to outputs of other components of the circuit design; and
annotating the outputs of the other components of the circuit design with the magnitude of the output voltage.

10. The apparatus of claim 9, wherein the instructions are configured to cause one or more processing devices to perform operations further comprising determining whether the at least one of the other components of the circuit design include a rule violation based on the propagation of the magnitude of the output voltage.

11. The apparatus of claim 8, wherein the instructions are configured to cause one or more processing devices to perform operations further comprising identifying an input voltage for the set of components, wherein determining the magnitude of the output voltage for the set of components based, at least in part, on the input voltage for the set of components and the design pattern representing the voltage-transition device.

12. The apparatus of claim 8, wherein matching the set of components in the circuit design to the design pattern representing the voltage-transition device further comprising comparing the design pattern with the circuit design to identify the voltage-transition device in the circuit design.

13. The apparatus of claim 8, wherein matching the set of components in the circuit design to the design pattern representing the voltage-transition device further comprising:
comparing a hierarchical design pattern including a first pattern and a second pattern to the circuit design to determine the circuit design includes a first device corresponding to the first pattern and a second device corresponding to the second pattern; and
correlating the first device and the second device to the design pattern to identify the voltage-transition device in the circuit design.

14. The apparatus of claim 8, wherein the circuit design is a netlist of components and their corresponding interconnections, and wherein matching the set of components in the circuit design to the design pattern representing the voltage-transition device further comprises comparing one or more portions of the netlist to the design pattern to identify the voltage-transition device in the circuit design.

15. A system comprising:
a memory system configured to store computer-executable instructions; and
a computing system including at least one processing device that, in response to execution of the computer-executable instructions, is configured to:

match a set of components in a circuit design to a design pattern representing a voltage-transition device;
determine a magnitude of an output voltage for the set of components in the circuit design based, at least in part, on information associated with the design pattern that matched the set of components; and
modify the circuit design to include the magnitude of the output voltage for the set of components.

16. The system of claim 15, wherein the computing system, in response to execution of the computer-executable instructions, is further configured to propagate the magnitude of the output voltage to outputs of other components of the circuit design, and annotate the outputs of the other components of the circuit design with the magnitude of the output voltage.

17. The system of claim 16, wherein the computing system, in response to execution of the computer-executable instructions, is further configured to determine whether the outputs of the other components of the circuit design include a rule violation based on the propagation of the magnitude of the output voltage.

18. The system of claim 15, wherein the computing system, in response to execution of the computer-executable instructions, is further configured to determine the magnitude of the output voltage for the set of components based, at least in part, on the input voltage for the set of components and the design pattern representing the voltage-transition device.

19. The system of claim 15, wherein the computing system, in response to execution of the computer-executable instructions, is further configured to compare the design pattern with the circuit design to identify the voltage-transition device in the circuit design.

20. The system of claim 15, wherein the computing system, in response to execution of the computer-executable instructions, is further configured to:
compare a hierarchical design pattern including a first pattern and a second pattern to the circuit design to determine the circuit design includes a first device corresponding to the first pattern and a second device corresponding to the second pattern; and
correlate the first device and the second device to the design pattern to identify the voltage-transition device in the circuit design.

* * * * *